United States Patent Office 3,437,922
Patented Apr. 8, 1969

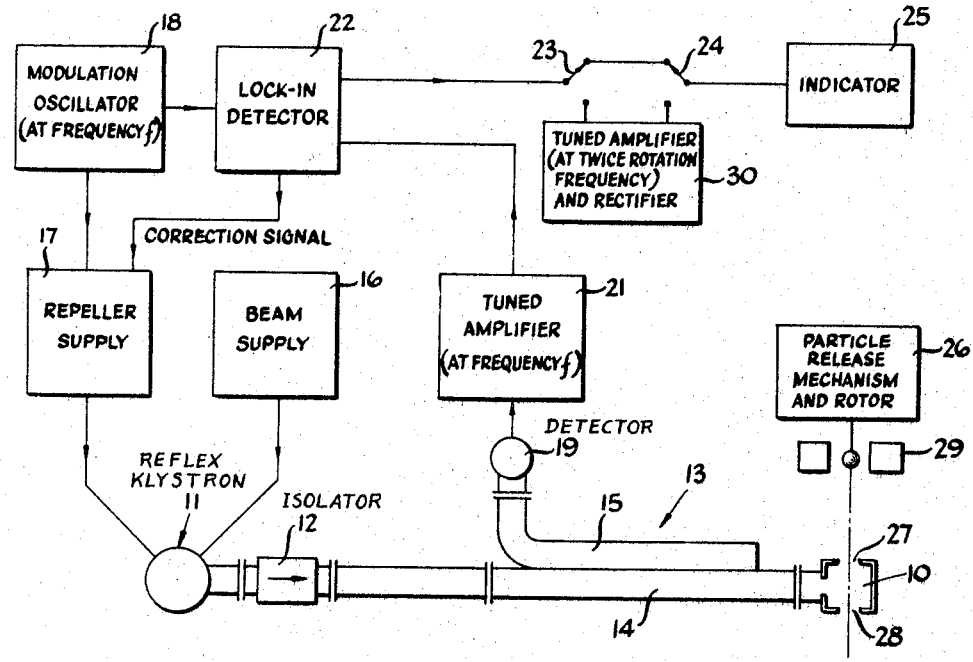
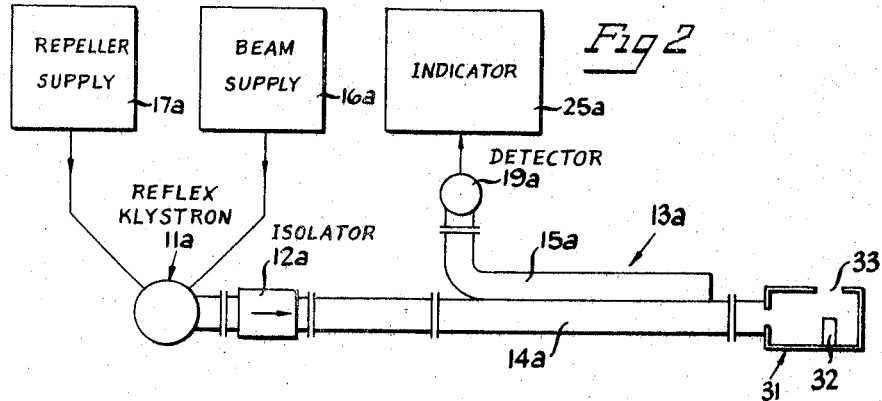

3,437,922
MICROWAVE DIMENSIONAL MEASURING
APPARATUS AND METHOD
Park H. Miller, Jr., Del Mar, Calif., assignor, by mesne assignments, to Gulf General Atomic Incorporated, San Diego, Calif., a corporation of Delaware
Filed Oct. 2, 1963, Ser. No. 313,303
Int. Cl. G01r 27/04
U.S. Cl. 324—58.5    4 Claims This invention relates to methods of and apparatus for measuring selected dimensional characteristics of a body of material and more particularly to measurements of such characteristics without mechanical contact to the body.

Present day technology requires measurements of various physical and/or dimensional characteristics of bodies of material with reasonably high accuracy. However, certain practical limitations are imposed on "contact" devices (e.g. micrometers) and methods (e.g. volumetric displacement techniques) currently employed in such measurements, particularly when the body has certain unusual characteristics. For example, bodies that have been subjected to irradiation or those at extremely high or low temperatures cannot be readily measured by conventional "contact" techniques without substantial difficulty. Moreover, the various devices and techniques previously employed to measure the presence of eccentricities on bodies having a generally uniform shape are, for the most part, complex and time consuming, and the need exists for an inexpensive yet simple method whereby such measurments can be effected.

It is a prime object of the present invention to provide an inexpensive and relatively simple method of measuring various dimensional characteristics of a body of material without mechanical contact to the body.

Still another object of the present invention resides in the provision of apparatus which can readily effect measurements of characteristics such as thermal expansion, the presence of eccentricities on bodies of material of generally uniform shape, etc., without mechanical contact to the body.

A further object of the present invention resides in the provision of a relatively low cost method of and apparatus for accurately measuring selected characteristics of a body of material through the utilization of a microwave resonant cavity.

Other objects and advantages of the present invention will be apparent from the following detailed description when considered in conjunction with the accompanying drawing wherein:

FIGURE 1 is a schematic representation of one preferred embodiment of the measuring apparatus contemplated by the present invention; and FIGURE 2 is a view similar to FIGURE 1 which schematically illustrates another embodiment of the measuring apparatus contemplated by the present invention.

In general, the present invention contemplates the provision of a method of and apparatus for measuring selected dimensional characteristics of a body of material. In accordance with the general provisions of the invention, a resonant condition is established within a micowave cavity. Thereafter, a body of material having the characteristic of interest is either disposed within or passed through the microwave cavity. The presence of the body in the microwave cavity will effect a perturbation of the resonant microwave condition. By suitably monitoring the change in frequency that is caused by the presence of the perturbing body within the microwave cavity, the characteristic of interest can be readily determined with a high degree of accuracy. In this connection, the observed frequency deviation caused by the perturbing body can either be compared against previously calibrated results to determine the characteristic of interest or the observed frequency deviation can be utilized to analytically arrive at the desired values.

To facilitate a general understanding of the basic concepts underlying the invention, certain general principles should be considered. A resonant microwave cavity has discrete frequencies and resonance properties analogous to those of a parallel L-C circuit. That is, placing a perturbing body in the region of the microwave cavity where the electric field dominates effects a result similar to that obtained by the placement of a conducting object in the electric field established between the plates of a capacitor. Similarly, placing a perturbing object in the region of the resonant cavity wherein the magnetic field dominates, achieves a result similar to that which occurs when a conductive object is placed inside a coil of an inductor. More particularly, the placement of a conductive object in the region of the dominant electric field in a microwave cavity is equivalent to decreasing the spacing between the plates of a capacitor whereby a decrease in the resonant frequency of an L-C circuit incorporating the capacitor is effected. The placement of the conductive perturbing body in the region of a microwave cavity where the magnetic field is dominant is analogous to causing a reduction in the flux linkage in a coil, i.e. a reduction in inductance in an L-C network, which will lead to an increase in the resonant frequency thereof. This analogy of a microwave cavity to an L-C network is particularly applicable to the basic principles underlying the present invention wherein the deviation from the resonant frequency caused by the perturbing body is used as the basis for determining the characteristics of interest.

The following detailed description will be directed primarily to three characteristics of bodies of material which can be accurately measured by the methods and apparatus contemplated by the invention. However, other characteristics of bodies of material can also be determined through the utilization of the present invention, which may or may not require slight variations in the apparatus or method steps hereinafter described.

An embodiment of the apparatus contemplated by the present invention is illustrated in FIGURE 1. This circuitry and associated measuring equipment is designed for measuring the volume of bodies, and determining coefficients of thermal expansion of bodies of material. The apparatus can also be utilized to determine the roundness of generally spherical objects as well as the presence of eccentricities on ellipsoids.

As shown, the apparatus includes a microwave cavity 10 which has a high frequency signal supplied thereto from a primary signal source 11 through a conventional isolator 12 and a directional coupler 13. The directional coupler includes a main wave guide 14 and an auxiliary wave guide 15 that is coupled to the main guide by means of a plurality of apertures (not shown), the function of which will be hereinafter described.

The primary signal source 11 is preferably a conventional reflex klystron which has operating power supplied thereto from source 16 and 17. The controllable frequency output of the klystron is tuned and adjusted in the usual manner by adjusting the repeller voltage supplied thereto from the source 17. In accordance with the invention, the output frequency from the klystron 11 is modulated at a constant low frequency ($f$) by a frequency modulating signal that is supplied to the repeller voltage supply source 17 from an oscillator 18.

During operation of the measuring apparatus, the normal output frequency of the klystron, the carrier frequency, is initially tuned to the resonant frequency of the cavity 10, which frequency shall be designated ($f_r$). Accordingly, the output frequency of the klystron 11 is varied over a range of frequencies between the frequency ($f_r - \Delta f$) and the frequency ($f_r + \Delta f$), and the frequency variation ($\Delta f$) being dictated by the amplitude of the frequency modulating signal. Maximum power absorption in the cavity occurs when the output signal from the klystron 11 equals the resonant frequency of the cavity so that the amplitude of the signal reflected from the cavity is minimum at this frequency. The amplitude of the reflected signal becomes maximum at the frequencies ($f_r - \Delta f$) and ($f_r + \Delta f$).

Intermediate these frequencies and the resonant frequency ($f_r$), the amplitude of the reflected signal varies substantially uniformly. Accordingly, with the carrier frequency tuned to the resonant frequency of the cavity the signal reflected from the cavity is amplitude modulated at a frequency equal to twice the modulating frequency ($f$) or at a frequency ($2f$).

The amplitude modulated signal reflected from the cavity is picked up by the directional coupler 13 and fed through the auxiliary wave guide 15, which has one end thereof 15a terminated in a conventional manner by a crystal detector 19. More particularly, the directional coupler is selected so that two of the plurality of apertures coupling the main and auxiliary guides of the directional coupler are suitably spaced so that the components of the reflected wave pass therethrough, add together in the auxiliary guide, and are fed to the crystal detector 19. In addition, the directional coupler is selected so that the components of the signal being transmitted to the cavity from the klystron cancel upon passing through the appropriate aperture pair.

The crystal detector 19, which may be any one of several commercially available types, demodulates the signal reflected from the cavity and picked up by the directional coupler. The output of the crystal detector which, when the carrier frequency is equal to the resonant frequency of the cavity, is a pulsating signal at a frequency equal to twice the modulating frequency ($f$) is fed to a tuned amplifier 21. However, in accordance with the provisions of the invention, the amplifier 21 is tuned to the modulating frequency ($f$) so that there is no output signal derived therefrom when the carrier frequency of the klystron 11 is tuned to the resonant frequency ($f_r$) of the cavity 10.

As illustrated in FIGURE 1, the output of the tuned amplifier 21 is connected to a conventional lock-in detector 22. The detector also is connected to the output of the oscillator 18 so that the modulating signal at the frequency ($f$) is continually supplied thereto. The detector 22 compares the phase of the output signal from the oscillator 18 with that of the signal fed from the tuned amplifier 21 and provides a DC output signal whose sign depends on the phase difference therebetween and whose magnitude depends on the size of the frequency difference between the resonant frequency of the cavity and the klystron. In this connection, a signal from the tuned amplifier 21 is supplied to the detector 22 whenever the klystron carrier frequency is not equal to the cavity resonant frequency. This latter condition occurs when a perturbing object is placed within the cavity after the establishment of a resonant condition therein as previously described.

More particularly, if a perturbing object enters the cavity 10, the resonant frequency of the cavity no longer equals ($f_r$). Consequently, the carrier frequency of the modulated klystron output signal is no longer matched to the cavity resonant frequency which is now at a different frequency. Since the carrier frequency of the output signal from the klystron 11 is still at the frequency ($f_r$) when the perturbing body initially enters the cavity, the previously observed condition of peak absorption is not realized. That is, as the unadjusted output signal of the klystron varies over the frequency range ($f_r - \Delta f$) through ($f_r + \Delta f$), the amplitude of the reflected signal again varies from a minimum to a maximum value. However, in this instance, the amplitude of the modulated signal reflected from the cavity will contain a component at the frequency ($f$) along with higher harmonics thereof.

As previously described, the reflected signal is coupled to the crystal detector 19 through the auxiliary guide 15. However, in this instance the demodulating or rectifying action of the crystal detector effects the production of a pulsating signal having a component of the frequency ($f$) as well as higher harmonics thereof. This signal is fed to the tuned amplifier 21 which passes the frequency ($f$) but blocks the higher harmonic components and feeds the signal to the detector 22. In the lock-in detector 22, the phase of the modulating signal from the oscillator 18 is compared with the signal supplied by the amplifier 21, and the detector developes a DC output voltage whose polarity depends on the difference in phase between the two signals and whose magnitude depends upon the size of the frequency difference between the resonant frequency of the cavity of the klystron. This "correction voltage" produced in the output of the lock-in detector is fed to the repeller supply 17 and through interconnected switch contacts 23 and 24 to a suitable high speed indicator 25, such as a digital voltmeter. The voltage fed to the repeller voltage supply source 17 from the detector effects a change in the magnitude of the voltage supplied to the repeller of the klystron 11 so that the carrier frequency of the klystron is tuned to the new resonant frequency ($f_r'$) of the cavity 10 with the perturbing body located therein. In addition, the "correction voltage" is fed to the indicator 25 which yields a direct indication thereof.

The volume of the body can be measured by dropping the body through the cavity 10. The body is held above the cavity by a suitable release mechanism 26, such as a feed tube having a mechanically actuated slide. When released therefrom, the body passes through an aperture 27 in the upper wall of the cavity. The body passes through the cavity and is discharged therefrom through an aperture 28 in the lower wall thereof. The body may be guided in its passage through the cavity as by a quartz tube or by a tube (not shown) constructed of material such as sold under the trademark "Teflon." For a right circular cylindrical cavity, the cavity is preferably operated in the $TM_{010}$ mode whereat the electric field is everywhere parallel to the axis of the cylinder.

As the body passes through the cavity, the signal voltage measured by the indicator 25 is utilized to arrive at the desired volume measurement either through an analytical process or through an interpolation scheme. In arriving at the volume of the perturbing object or body by interpolation (which is somewhat more practical than the analytical approach and yet sufficiently accurate), the cavity 10 is initially calibrated by passing bodies therethrough having shapes similar to those being measured but having known volumes. A plot of peak voltage value vs. volume is then obtained from which the volumes of subsequently measured specimens can readily be determined.

If, during a volume measurement, the perturbing body passes through the region of the cavity whereat the electric field dominates and is substantially uniform, the carrier frequency of the output signal from the reflex klystron is decreased due to a variation in repeller voltage and a resonant condition is again established within the cavity. On the other hand, if the initial resonant mode is such that the perturbing body passes through a region of the cavity whereat the magnetic field dominates and is substantially uniform, the carrier frequency of the output signal from klystron 11 is increased to once again establish a resonant condition within the cavity.

The accuracy of volume measurements carried out in the aforedescribed manner will depend on several factors; however in general, the accuracy of these measurements will be at least as good as that achieved with the more complex conventional "contact" techniques. More particularly, such factors as sample orientation, cavity shape and the physical dimensions thereof, the frequency selectivity or "Q" of the cavity, and the skin depth of the body will bear directly on the accuracy of measurements effected by the apparatus shown in FIGURE 1. The "Q" characteristics of microwave resonators and how variations in cavity size and shape effect same is dealt with in detail in Chapter 17 of the text entitled Theory and Application of Microwaves by Bronwell and Beam, published by the McGraw Hill Book Company, Inc. These factors (e.g. the design of the cavity, the operational resonant mode, etc.) will not be treated in detail. However, the cavity utilized with the illustrated apparatus is preferably a high "Q" (e.g. in excess of 3,000) cavity having a volume at least 20 times greater than the volume of the typical sample which is to be measured. This disproportionment between cavity and sample volume is desirable so that the frequency shift caused by the presence of the perturbing object within the cavity is not greater than the possible frequency change in the klystron.

Another significant factor which will bear on the accuracy of the volume measurements effected by the apparatus shown in FIGURE 1 is the "skin depth" of the body being measured. Although, in many cases this factor can be ignored without adversely affecting the desired accuracy of the results, it is often times necessary to compensate for this factor which can be accomplished in a conventional manner once the conductivity of the material is known or can be determined.

When the coefficient of thermal expansion of a body is measured by the apparatus, the body is initially suspended within an oven, generally designated by the numeral 29 and heated to a selected temperature, the value of which is recorded. During the heating of the body, the frequency modulated output from the klystron 11 is tuned so that the carrier frequency of the output signal is initially the same as the resonant frequency of the cavity 10. If desired the cavity can be heated to the same temperature as the body.

After a resonant condition is established within the cavity and the body is heated to the desired temperature, the release mechanism 29 discharges the body from the oven so that the body passes through the cavity.

The transient presence of the heated body within the microwave cavity effects a perturbation of the resonant condition within the cavity so that the amplitude modulated signal reflected from the cavity and picked up by the crystal detector 19 contains a component at the frequency of the modulating signal. The pulsating output of the crystal detector is fed to the tuned amplifier 21 which passes the signal to the lock-in detector 22. As previously described, the phase of the reflected signal is matched against the phase and frequency of the reference modulating signal supplied by the oscillator 18 and an output voltage proportional to the size of difference in frequency between the resonant frequency of the cavity and the klystron is produced by the detector.

The output voltage of the lock-in detector 22, which varies as the heated body passes through the cavity, is simultaneously fed to the repeller voltage supply source 17 and through the switch contacts 23 and 24 to the indicator 25. Upon being fed to the repeller voltage supply source 17, the "correction voltage" effects a variation in the repeller voltage supplied to the klystron 11, with an accompanying adjustment in the output frequency thereof. In addition the signal recorded by the indicator 25 yields one of the values utilized to determine the coefficient of thermal expansion of the body. To complete a valid determination of the coefficient of thermal expansion of a sample, the body must be replaced in the oven and heated to a new temperature (e.g. 100° C. higher than the first temperature), which temperature is again recorded. The heated body is then discharged through the resonant cavity once again so that a second "correctional voltage" value is recorded by the indicator 25. With the apparatus suitably calibrated prior to effecting such measurements, the coefficient of thermal expansion of a body is readily determined from the change in volume indicated by the peak values of the correctional voltages recorded by the indicator 25 during successive measuring steps at different temperatures.

The apparatus illustrated in FIGURE 1 can also be utilized to determine the roundness of spherical objects and to effect determinations as to the presence of eccentricities of bodies which are generally ellipsoids. To effect such measurements with the illustrated apparatus, the switch positions relative to the contacts 23 and 24 are changed so that a tuned amplifier 30 incorporating a rectifier circuit is included in the output circuit of the detector 22. As hereinafter described, the tuned amplifier and rectifier 30 is utilized to produce a D.C. output signal that is fed to the indicator 25, should eccentricities be detected on the body being passed through the cavity.

Assuming that a resonant condition has been established within the cavity 10 and that it is desired to determine the sphericity of an object such as a ball bearing, the body is caused to rotate or spin about an axis that is orthogonal to the direction of the field in the volume through which the object passes. After being set in spinning motion, the body is passed through the cavity 10 thereby effecting a perturbation of the resonant condition previously established therein. If the body passed through the cavity has any type of eccentricity which distorts the sphericity of the body, the spinning of the body during the passage thereof through the cavity results in a periodic variation in the reflected signal. More particularly, inasmuch as the eccentricity on the body effects a different degree of perturbation as it passes through regions of varying dominant field strength the effect is that the reflected signal periodically shifts during the transient presence of the body within the cavity. Moreover, since the body spins on an axis orthogonal to the direction of the field in the volume through which the object passes, the eccentricity passes perpendicularly through the field. As a consequence, the frequency at which the reflected signal varies is equal to twice the frequency of rotation of the body. The reflected signal, when picked up by the detector 19 is demodulated and the pulsating output signal from the crystal detector is fed to the tuned amplifier 21. Since the reflected signal contains a component at the frequency of the reference modulating signal supplied from the oscillator 18 the amplifier 21 passes this signal having the aforedescribed varying phase characteristic to the lock-in detector 22.

Inasmuch as the reflected signal supplied to the detector 22 periodically varies, the amplitude of the correctional voltage supplied by the phase detector also varies at the same periodic rate (i.e., at twice the frequency of rotation). As previously described, the correctional voltage having the varying amplitude is fed to the repeller supply source 17 so that the carrier frequency of the klystron 11 "tracks" the varying resonant condition of the cavity during the transient presence of the body therein. The correctional voltage is also fed through the tuned amplifier 30, which is tuned to a frequency equal to twice the frequency of rotation of the body.

Accordingly, the varying amplitude component of the correctional voltage is passed, rectified and supplied to the indicator 25 which yields an indication of the presence of the eccentricity on the body, the signal being proportional to any such eccentricity.

The technique employed to determine the roundness of generally spherical objects can also be utilized in the manner similar to that described to determine the presence of eccentricities on bodies which are generally ellipsoids. The primary difference between the measuring technique employed to effect the latter measurements resides in the fact that the body in the latter case is initially rotated about two different orthogonal axes prior to the body being discharged through the cavity 34.

A specific embodiment of the apparatus illustrated in FIGURE 1 includes a cylindrical cavity which is formed of brass having a diameter of approximately 1⅛ inches and a height of 1¾ inches. Measurements of coefficients of thermal expansion and eccentricity measurements are carried out with the cavity operated in the $TM_{010}$ mode with the unperturbed cavity having an initial resonant frequency of 8486 mc./sec. The klystron is frequency modulated at 60 kc./sec. with a frequency deviation of about 40 kc./sec. The volume of a 1/16 inch diameter ball is measured to about one part in $10^3$.

A second embodiment of the apparatus is shown in FIGURE 2. This embodiment is designed to measure the volume of a stationary body. As shown, the apparatus includes some of the major components incorporated in the measuring apparatus disclosed in FIGURE 1. These components are indicated with the same reference numeral with the subscript "a." However, certain components are not needed in this latter embodiment to render it completely suitably for effecting the aforedescribed stationary measurements.

More particularly, the reflex klystron 11a, which is suitably connected to the repeller voltage supply source 17a and power supply source 16a, has the output thereof coupled to a microwave cavity 31 through the isolator 12a and directional coupler 13a that includes the main and auxiliary guides 14a and 15a, respectively. The signal reflected from the cavity 31 is picked up by the detector 19a, which terminates one end of the auxiliary guide 15a of the directional coupler, is rectified and fed to a suitable indicator 25a that is connected to the output of the crystal detector 19a.

The cavity 31 illustrated in FIGURE 2 is a rectangular housing and is formed of a material such as aluminum which has a suitable supporting post 32 positioned therein. Preferably the supporting post 32 is formed of a material such as sold under the trademark "Styrofoam," which has a relatively low dielectric constant so that minimum field distortion results from the presence thereof in the cavity. The supporting post is preferably located in the region of the cavity whereat the field strength of the dominant mode is maximum and substantially uniform throughout. An aperture 33, which is located in the upper wall of the housing in alignment with the supporting post 32, allows the insertion and withdrawal of a body, the volumetric characteristics of which are to be measured.

The signal voltage displayed on the indicator 25a is utilized to arrive at the desired volume measurement either through an analytical process or through an interpolation scheme. In arriving at the volume of the perturbing object or body by interpolation (which is somewhat more practical than the analytical approach and yet sufficiently accurate), the cavity 31 is initially calibrated by inserting shapes similar to those being measured but having known volumes. A plot of resonant frequency versus volume is then obtained from which the volumes of subsequently measured specimens can readily be determined.

It should be understood that the embodiments of the apparatus illustrated in FIGURES 1 and 2 can readily be modified for commercial production operations. For example, in FIGURE 1 a suitable audible or visual signaling device can be connected to the output of the lock-in detectors incorporated in the circuitry. The signaling device can be suitably conditioned so that if the correctional voltage produced by the detector is above or below preset voltage levels a signal is rendered. These preset voltage levels can be adjusted to correspond to established production tolerances so that the actuation of the signal indicates that the article does not fall within these production limits. Accordingly, the present invention provides a method and apparatus which can be readily adapted for mass production techniques or if desired, can be utilized to yield highly accurate measurements of selected dimensional characteristics of a body of material without mechanical contact to the body.

Various modifications of the apparatus and method contemplated by the invention could be devised by one skilled in the art without departing from the invention. Various features of the invention are set forth in the following claims.

What is claimed is:

1. Apparatus for measuring a selected characteristic of a body of material, which apparatus comprises a microwave resonator for receiving the body, a high frequency source, means coupling the output from said high frequency source to said microwave resonator, means electrically connected to said high frequency source for modulating the output signal therefrom so that a range of frequencies is fed to the resonator including the resonant frequency thereof prior to the introduction of the body thereto, means electrically connected to said microwave resonator for monitoring the signal reflected therefrom, means electrically connected to said monitoring means for producing an electrical signal related to the difference between the resonant frequency of the cavity prior to the introduction of the body thereto and the resonant frequency of the cavity with the body present therein, means electrically connected to said signal producing means for varying the frequency of the high frequency source in response to the electrical signal to return the resonator to a resonant condition with the body therein, and means electrically connected to said signal producing means for measuring the electrical signal whereby the characteristics of the body can be determined.

2. Apparatus for measuring a selected characteristic of a body of material, which apparatus comprises a microwave resonator for receiving the body, a high frequency source, means coupling the output from said high frequency source to said microwave resonator, a low frequency oscillator connected to said high frequency source for supplying a modulating signal to said high frequency source to effect frequency modulation of the output signal therefrom so that a range of frequencies including the resonant frequency thereof is fed to the resonator prior to the introduction of the body thereto, means electrically connected to said microwave resonator for monitoring the signal reflected therefrom, said reflected signal containing a component at the frequency of the modulating signal when the body is initially introduced to said resonator, means electrically connected to said monitoring means and said oscillator for comparing the phase of the reflected signal with the phase of the modulating signal supplied by the oscillator and for producing an electrical signal related to the difference therebetween resulting from the introduction of the body to the cavity, means connected to said signal producing means for varying the frequency of the high frequency source to a frequency such that a resonant condition occurs with the body in the cavity, and means electrically connected to said signal producing means for measuring the electrical signal whereby the characteristic of the body can be determined.

3. Apparatus for determining the sphericity of a body of material, which apparatus comprises a microwave resonator for receiving the body, means for rotating the body prior to its introduction into said resonator, a high frequency source, means coupling the output from said high frequency source to said microwave resonator, said source being adjusted to operate at the resonant frequency of the resonator, a low frequency oscillator connected to said high frequency source for supplying a modulating signal to said high frequency source to effect frequency modulation of the output signal therefrom so that a range of frequencies including the resonant frequency thereof is fed to the resonator prior to the introduction of the body thereto, means electrically connected to said microwave resonator for monitoring the signal reflected therefrom, said reflected signal containing a component at the frequency of the modulating signal when the body is initially introduced to said resonator, means electrically connected to said monitoring means and said oscillator for comparing the phase of the reflected signal with the phase of the modulating signal supplied by the oscillator and for producing an electrical signal related to the difference therebetween resulting from the introduction of the body to the cavity, means connected to signal producing means for adjusting the frequency of the source to maintain a resonant condition in the resonator, means electrically connected to said signal producing means for passing only signals having a frequency of twice the frequency of rotation of the body, and means connected to said passing means for measuring the passed signal whereby the roundness of the body can be determined.

4. A method of measuring a selected characteristic of a body of material, comprising the steps of exciting a resonant cavity with a high frequency signal, modulating said high frequency signal so that a range of frequencies is fed to the resonator including the resonant frequency thereof prior to the introduction of the body thereto, monitoring the signal reflected from said resonator, deriving an electrical signal indicative of the difference between the resonant frequency of the cavity prior to the introduction of the body and the resonant frequency of the cavity with the body therein, varying the frequency of the high frequency source in response to said electrical signal for returning the resonator to a resonant condition with the body therein, and measuring said electrical signal whereby the selected characteristic of the body can be determined.

References Cited

UNITED STATES PATENTS 3,090,003  5/1963  Rempel et al. _____ 324—58.5 X
2,491,418  12/1949  Schlesman _____ 324—58.5 X

OTHER REFERENCES

Journal of Applied Physics, vol. 21, No. 10, pp. 956–961, article by Shaw et al., October 1950.

Strandberg, The Microwave Journal, pp. 66–73, June 1961.

RUDOLPH V. ROLINEC, *Primary Examiner.*

PAUL F. WILLE, *Assistant Examiner.*

U.S. Cl. X.R.

264—51, 329; 18—5